United States Patent [19]

Sugimoto

[11] Patent Number: 4,768,381
[45] Date of Patent: Sep. 6, 1988

[54] OPTICAL VIBROMETER

[75] Inventor: Hiroshi Sugimoto, Kobe, Japan

[73] Assignee: Mitsubishi Denki Kabushiki Kaisha, Japan

[21] Appl. No.: 100,617

[22] Filed: Sep. 24, 1987

[30] Foreign Application Priority Data

Oct. 1, 1986 [JP] Japan .................................. 61-234850

[51] Int. Cl.$^4$ .............................................. G01H 9/00
[52] U.S. Cl. ...................... 73/657; 356/349; 356/358
[58] Field of Search .................. 73/655, 657; 356/345, 356/349, 358, 373

[56] References Cited

FOREIGN PATENT DOCUMENTS 0090003  5/1986  Japan .................................... 356/373

OTHER PUBLICATIONS

Sanders, J. W., "Digital Transducer for Petroleum Exploration", IBM Technical Disclosure Bulletin, vol. 10, No. 5, (Oct. 1967).
"Measurement of Speaker Vibration Using Laser Doppler Vibrometer", Automation, Nikkan Kougyou Shinbunsha, Sep. 1982.
"Laser Doppler Vibrometer Equipped for Mobile Robot", Ouyou Kiki Kenkyusho of Mitsubishi Denki Kabushiki Kaisha.
"Application and Guide for Indicator of Optical Position", Marubun Co., Ltd.

Primary Examiner—Stewart J. Levy
Assistant Examiner—Lawrence Fess
Attorney, Agent, or Firm—Leydig, Voit & Mayer

[57] ABSTRACT

Three dimensional vibration of an object can be measured based on the light generated by a light source and the light reflected on a conical concave reflective surface disposed on the object. Measurement of the vibration is performed by using a measuring device for measuring frequency deviation of the reflected light and a device for measuring deviation of reflection position of the reflected light.

6 Claims, 4 Drawing Sheets

OPTICAL VIBROMETER

BACKGROUND OF THE INVENTION

This invention relates to an optical vibrometer and more particularly to an optical vibrometer in which the vibration of an object is measured by using a laser beam without contacting to the object.

FIG. 1 is a schematic view showing a conventional vibrometer using a laser beam. In FIG. 1, a laser beam generator 1 (laser beam source) generates a laser beam 4, which irradiates an object 3 to be measured, the vibration of which is . A measuring device 2 measures the laser frequency deviation. The irradiated laser beam 4 is reflected on the surface of the object 3. Then the reflected laser beam 5 returns to the measuring device 2. The returned laser beam 5 is detected by a vibration signal converter 6.

In the above-mentioned vibrometer, when the object 3 vibrates along the optical axis of the laser beam 4, the optical path length of the laser beam changes according to the axial vibration of the object 3. The optical vibration (optical frequency) changes depending on the changes in the optical path length. Therefore, the vibration of the object 3 along the optical axis of the laser beam 4 can be detected by measuring the variation of the optical frequency between the laser beams 4 and 5 using the measuring device 2 and the vibration signal converter 6.

In the above-mentioned vibrometer, however, the right angle vibration of the object 3 along the optical axis does not cause an optical frequency deviation. Therefore, the right angle vibration of the object 3 along the optical axis can not be measured by means of the vibrometer.

FIG. 2 is a schematic view showing an another conventional vibrometer using a laser beam. In FIG. 2, a laser beam generator 1 (laser beam source and the like) generates a laser beam 4, which irradiates a flat reflecting mirror 8 disposed on an object 3 to be measured. When the object 3 vibrates in a direction perpendicular to the reflective surface of the mirror 8, the point of reflection 9 of the reflected laser beam 5 changes. Therefore, by detecting the change of the point of reflection 9 of the reflected laser beam 5 of using an optical position measuring device 7, the vibratory condition of the object 3 can be measured.

In the above-mentioned vibrometer, however, if the direction of vibration of the object 3 is parallel to the reflective surface of the mirror 8, the reflection position 9 does not change. Accordingly, vibration parallel to the reflective surface of the mirror 8 can not be measured by means of such a vibrometer.

As mentioned above, in both of the conventional vibrometers, only uni-directional (one dimensional) vibration can be measured. Therefore, there arises a problem that if bi or tri directional (two or three dimensional) vibration is to be measured, it would be necessary to use two or three vibrometers.

SUMMARY OF THE INVENTION

Accordingly, an object of the present invention is to provide an optical vibrometer in which two or three dimensional vibrations of an object can be measured by one vibrometer.

In order to achieve the above objects, according to the present invention, there is provided an optical vibrometer comprising: a reflecting member having a conical concave reflective surface disposed on an object to be measured; a light source for generating light to irradiate the reflective surface of the reflecting member; a vibration measuring means disposed between the light source and the reflective surface of the reflecting member for measuring three dimensional vibration of the object based on the light generated by the light source and the reflected light on the reflective surface of the reflecting member.

In the present invention, two or three dimensional vibration of an object can be measured by using one vibrometer, therefore, it is not necessary to use two or three vibrometers as in the prior art, making the present vibrometer inexpensive.

BRIEF DESCRIPTION OF THE DRAWINGS

The present invention will be more readily apparent from the following detailed description of the preferred embodiments of the present invention when taken in conjunction with the accompanying drawings, in which.

DESCRIPTION OF THE PREFERRED EMBODIMENTS

Figure 1:
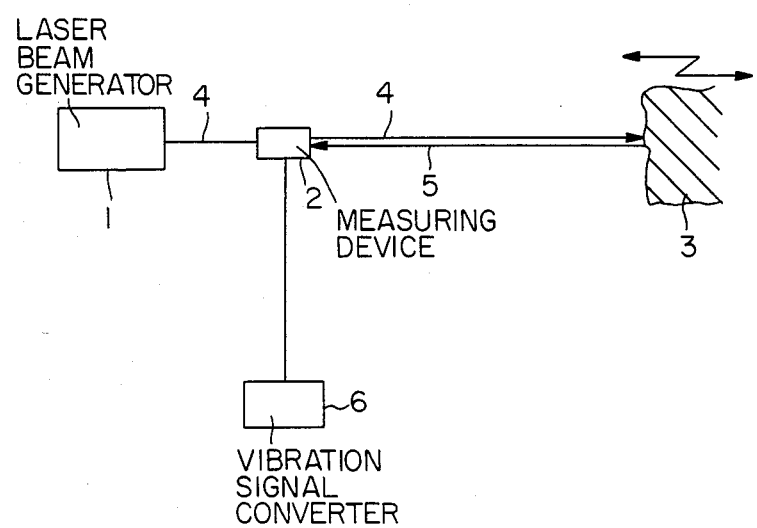
FIGS. 1 and 2 are schematic views showing conventional vibrometers using laser beams.
Figure 2:
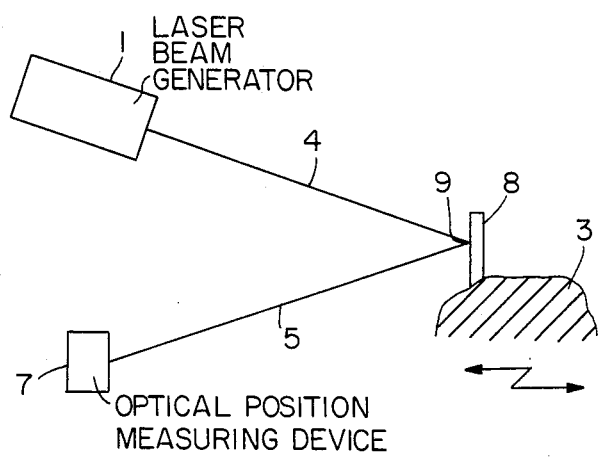
Figure 3:
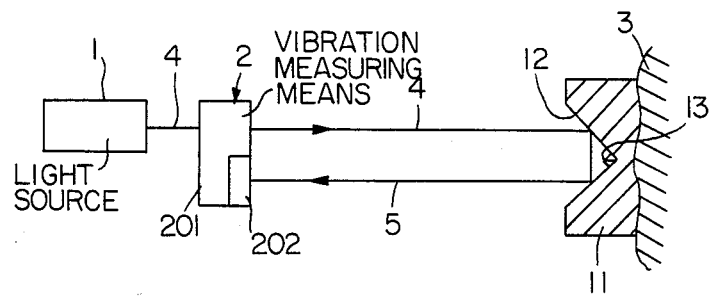
FIG. 3 is a schematic view showing an optical vibrometer in accordance with one embodiment of the present invention.

FIG. 3 is a schematic view showing an optical vibrometer, for example, a laser vibrometer in accordance with one embodiment of the present invention. In FIG. 3, an optical vibrometer according to the present invention comprises a reflecting member 11 having a conical concave reflective surface 12 disposed on an object 3 to be measured, a light source 1 for generating light 4 to irradiate the reflective surface 12 of the reflecting member 11, a vibration measuring means 2 disposed between the light source 1 and the reflective surface 12 of the reflecting member 11 for measuring the three dimensional vibration of the object 3 based on the light 4 generated by the light source 1 and the light 5 reflected from the reflective surface 12 of the reflecting member 11.

The light source 1, for example, a laser source generates a light such as a laser beam 4, which irradiates the reflecting member 11 disposed on the object 3 to be measured through a measuring device 201 for measuring the light frequency deviation of the laser beam 4. The reflective surface 12 of the reflecting member 11 is made of a conical concave reflective surface having an apex angle of 90 degrees. The laser beam 5 reflected from the reflecting member 11 returns to a light position measuring device 202 disposed in the vibration measuring means 2, where the vibration of the object 3 is detected. Here, a vibration measuring means 2 is constituted by the measuring devices 201 and 202.

Figure 4:
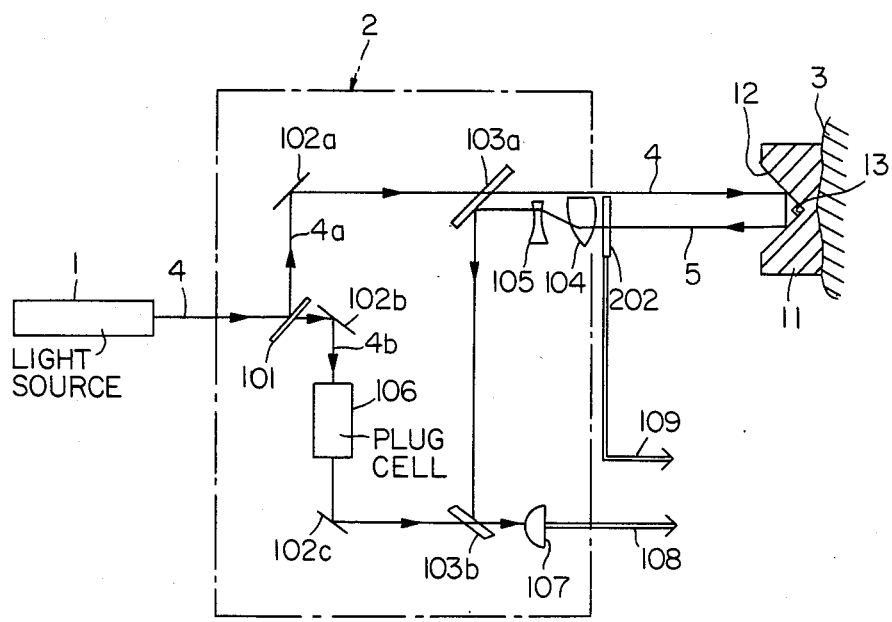
FIG. 4 is a detailed view of a vibration measuring means as shown in FIG. 3.

FIG. 4 is a detailed view showing the vibration measuring means 2. In FIG. 4, a laser beam 4 generated by a laser source 1 is divided into bi-directional laser beams 4a and 4b by a first beam splitter 101 disposed in a vibration measuring means 2. One of the divided laser beams 4a is reflected at a reflective mirror 102a, and then the optical axis of the reflected laser beam 4a is adjusted by passing through a second beam splitter 103a to then irradiate a reflective surface 12 of a reflecting member 11. The laser beam 5 reflected from the reflective surface 12 is reflected into the measuring device 202, and then passed through a convex lens 104 and a concave lens 105. The foci of both lens 104 and 105 are adjusted so that the reflected laser beam 5 runs parallel to the same optical axis thereof when exiting from the concave lens 105. The reflected laser beam 5 from the concave lens 105 is then introduced to a photodiode 107 through second and third beam splitters 103a and 103b.

The other laser beam 4b separated by the first beam splitter 101 is introduced into a plug cell 106 through a reflecting mirror 102b. This plug cell 106 is for modulating the passing laser beam 4b by using the output of an oscillator (not shown) and puts a deviation in the apparent light frequency of the laser beam 4b. The laser beam 4b from the plug cell 106 reaches the photodiode 107 through a reflecting mirror 102c and a third beam splitter 103b. The photodiode 107 converts the "beat signal" into an electrical signal 108, where the "beat signal" is the frequency difference between the laser beam 4b from the plug cell 106 and the reflected laser beam 5 from the reflecting member 11 of the object 3. The electrical signal 108 obtained therefrom corresponds to the output of frequency deviation, namely the X directional displacement as mentioned in FIG. 7A later. In the above-described embodiment, it is preferable to use a semi-transparent mirror for the above mirrors.

Figure 5:
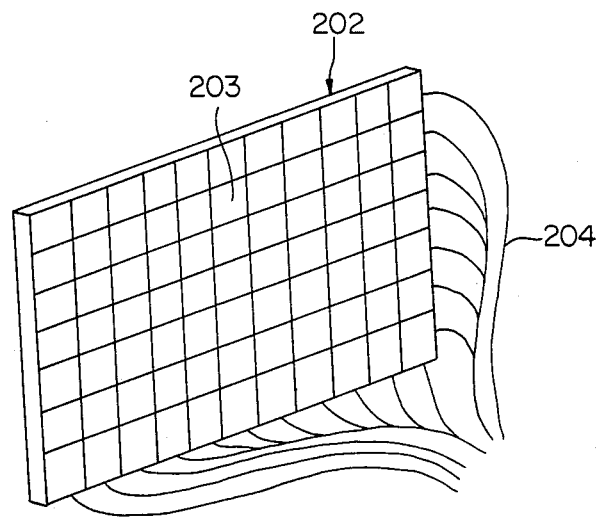
FIG. 5 is a perspective view showing a detailed structure of a light position measuring device as illustrated in FIG. 3.

FIG. 5 is a perspective view showing a detailed structure of a measuring device 202 for measuring light position. In FIG. 5, the measuring device 202 is fabricated by assembled a plurality of translucent photodiodes 203 into a cross cut form in plan. The measuring device 202 is for detecting which photodiode 203 the reflected laser beam 5 passes through to determine the position on the measuring device 202 and outputs the detected position as an electrical matrix signal through lead wires 204. The obtained signal corresponds to Y and Z directional displacements, namely positional discrepancies as mentioned later.

Figure 6A:
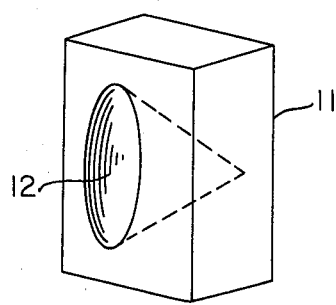
FIGS. 6A and 6B are a perspective view and a side sectioned view, respectively showing a reflecting member as illustrated in FIG. 3.
Figure 6B:
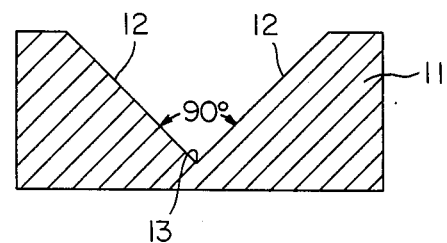

FIGS. 6A and 6B are a perspective view and a side sectional view, respectively showing a reflecting member 11 disposed on an object 3 to be measured. In these figures, the reflecting member 11 has a conical concave reflective surface 12. A proper angle of the apex of the conical concave reflection surface 12 is 90 degrees, however, another apex angle can be applied by changing the position of the devices 201 and 202.

Figure 7A:
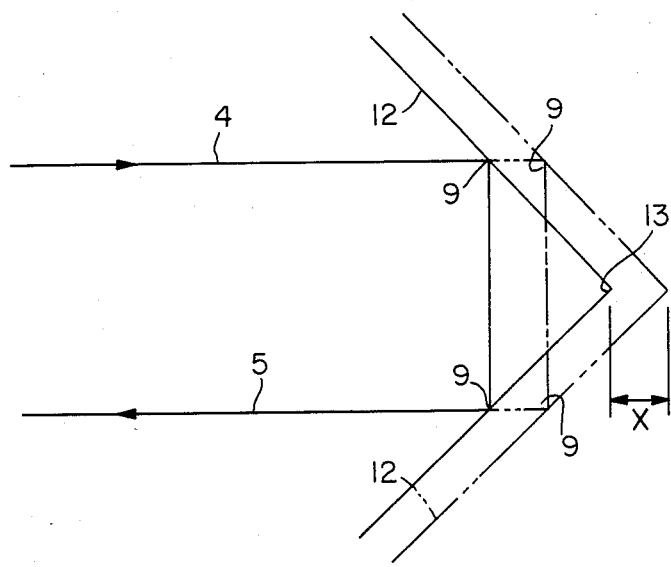
FIGS. 7A to 7C are schematic diagrammatic views showing conditions of laser beam reflection on the reflective surface of the reflecting member.
Figure 7B:
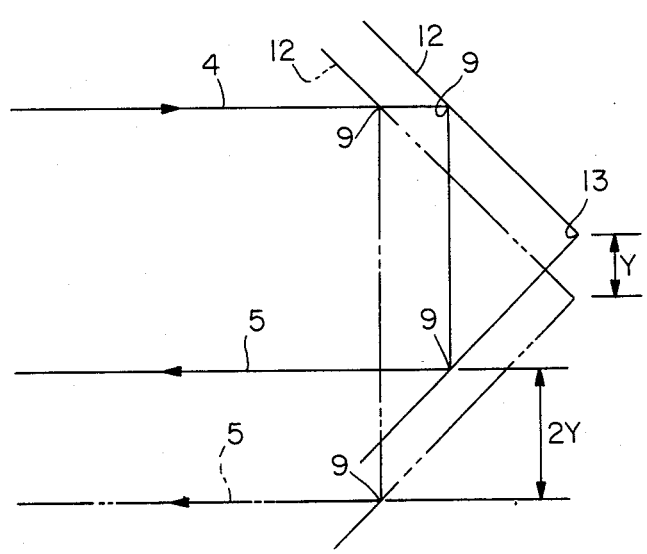
Figure 7C:
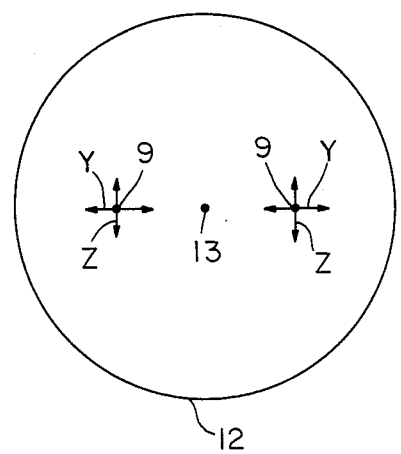

FIGS. 7A, 7B, and 7C are schematic diagrammatic views showing reflection conditions of the laser beam on the reflective surface 12 of the reflecting member 11. In these figures, solid lines depict the original position of the reflective surface 12 and the broken lines depict positions thereof moved by vibration.

FIG. 7A shows that the object 3 to be measured, namely the reflection member 11 vibrates along the optical axis of the laser beam 4. When the reflective surface 12 retreats along the optical axis a distance X, the light path length of the reflected laser beam 5 is lengthened by 2X. Therefore, a frequency deviation is induced in the reflected laser beam 5 during retreat of the reflective surface 12 by vibration. The induced frequency deviation is measured by the vibration measuring means 2 for measuring light frequency deviation. In this case, the positional discrepancy in the reflection point 9 at right angles to the light axis of the reflected laser beam 5 is not caused.

FIG. 7B shows that the reflection member 11 vibrates at right angles to the light axis of the laser beam 4. When the reflective surface 12 moves by a distance Y in a direction at right angles to the light axis, a positional discrepancy of 2Y at right angles to the light axis of the reflected laser beam 5 is caused. At this time, the light path length of the laser beam 4 does not change.

FIG. 7C is a front view showing that the reflecting member 11 vibrates in two directions at right angles to the light axis of the laser beam 4. The letter Y indicates one vibrational direction which is from the reflection point 9 on the reflective surface 12 to the apex 13 thereof, and the other letter Z indicates a vibration at right angles to the Y direction. In the case of this figure, positional discrepancies in the Y and Z directions arise from the vibration of the object 3. These positional discrepancies in the Y and Z directions, namely Y and Z directional vibration, can be measured by the measuring device 202.

When the object 3 vibrates over three dimensions, the frequency deviation to the X direction and the positional discrepancies in the Y and Z directions can be measured simultaneously. Accordingly, the direction and amplitude of three dimensional vibration of the object 3 can be measured.

While a few presently preferred embodiments of the present invention have been shown and described herein, it will be apparent to those skilled in the art that various changes and/or modifications thereof can be made without departing from the spirit and scope of the present invention as defined in the appended claims.

What is claimed is:

1. An optical vibrometer comprising:
    a reflecting member having a conical concave reflective surface disposed on an object to be measured;
    a light source for generating light to irradiate the reflective surface of said reflecting member;
    a vibration measuring means disposed between said light source and the reflective surface of said reflecting member for measuring vibration of the object in three dimensions based on the light generated by said light source and the reflected light on the reflective surface of said reflecting member.

2. An optical vibrometer as claimed in claim 1 wherein said vibration measuring means comprises:
    a first means for measuring a deviation of reflection position along an axis of the light; and
    a second means for measuring a deviation of reflection position along a direction at right angles to the axis of the light.

3. An optical vibrometer as claimed in claim 2 wherein said first means includes a measuring means for measuring frequency deviation of the reflected light.

4. An optical vibrometer as claimed in claim 2 wherein said second means comprises a plurality of photodiodes assembled into a cross cut form in plan.

5. An optical vibrometer as claimed in claim 1 wherein said light source includes a laser source.

6. An optical vibrometer as claimed in claim 1 wherein said conical concave reflective surface includes an apex angle of 90 degrees.

* * * * *